March 9, 1943. W. A. NELSON 2,313,164
SELF-RETAINING SURGICAL RETRACTOR
Filed Nov. 13, 1939 3 Sheets-Sheet 1
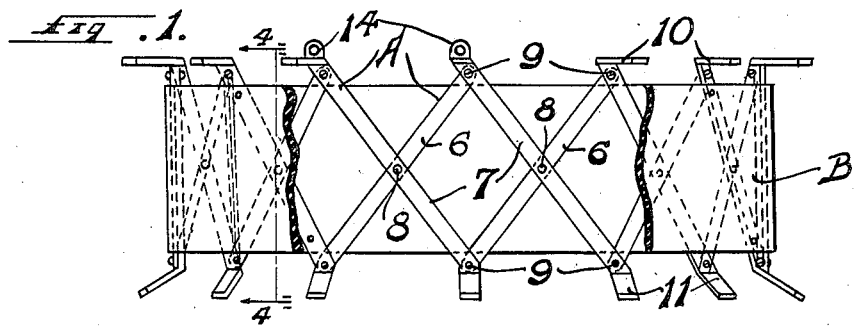
 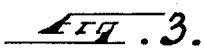 
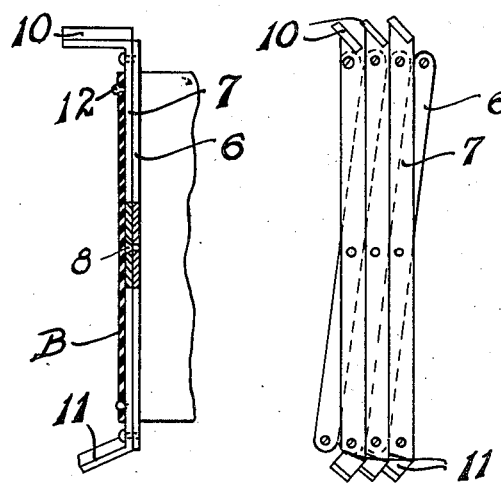 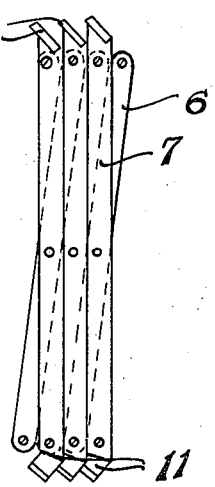 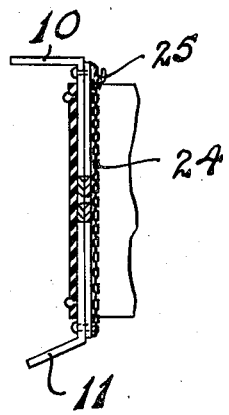
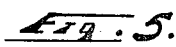 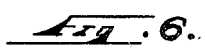 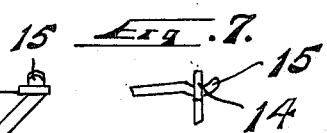
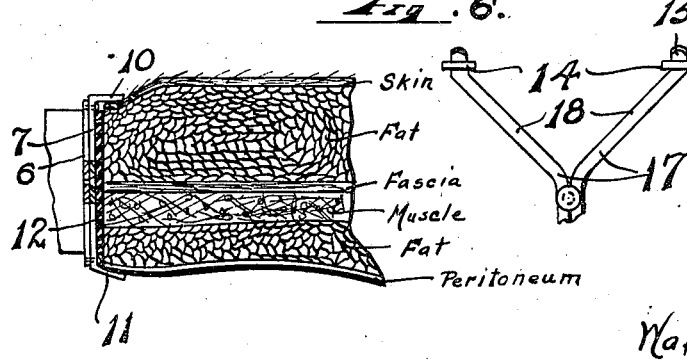
Inventor
Walfred A. Nelson
By R. M. Thomas
Attorney March 9, 1943.   W. A. NELSON   2,313,164
SELF-RETAINING SURGICAL RETRACTOR
Filed Nov. 13, 1939   3 Sheets-Sheet 2
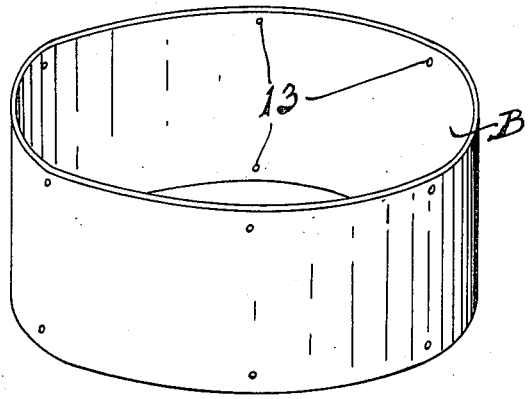
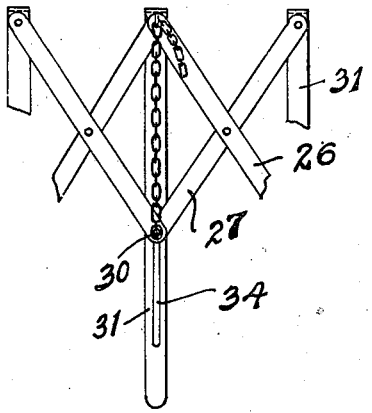
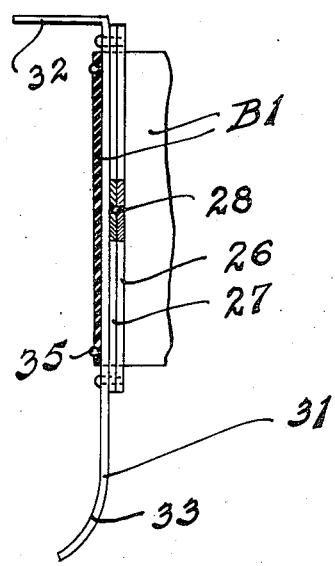
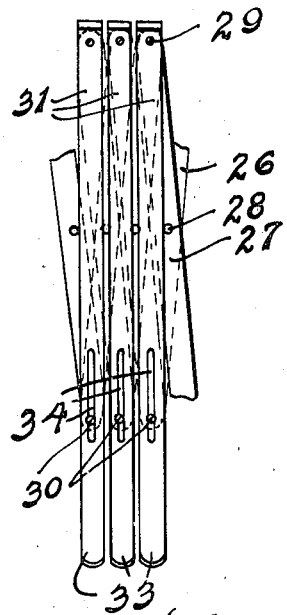
Inventor
Walfred A Nelson
By R. M. Thomas
Attorney

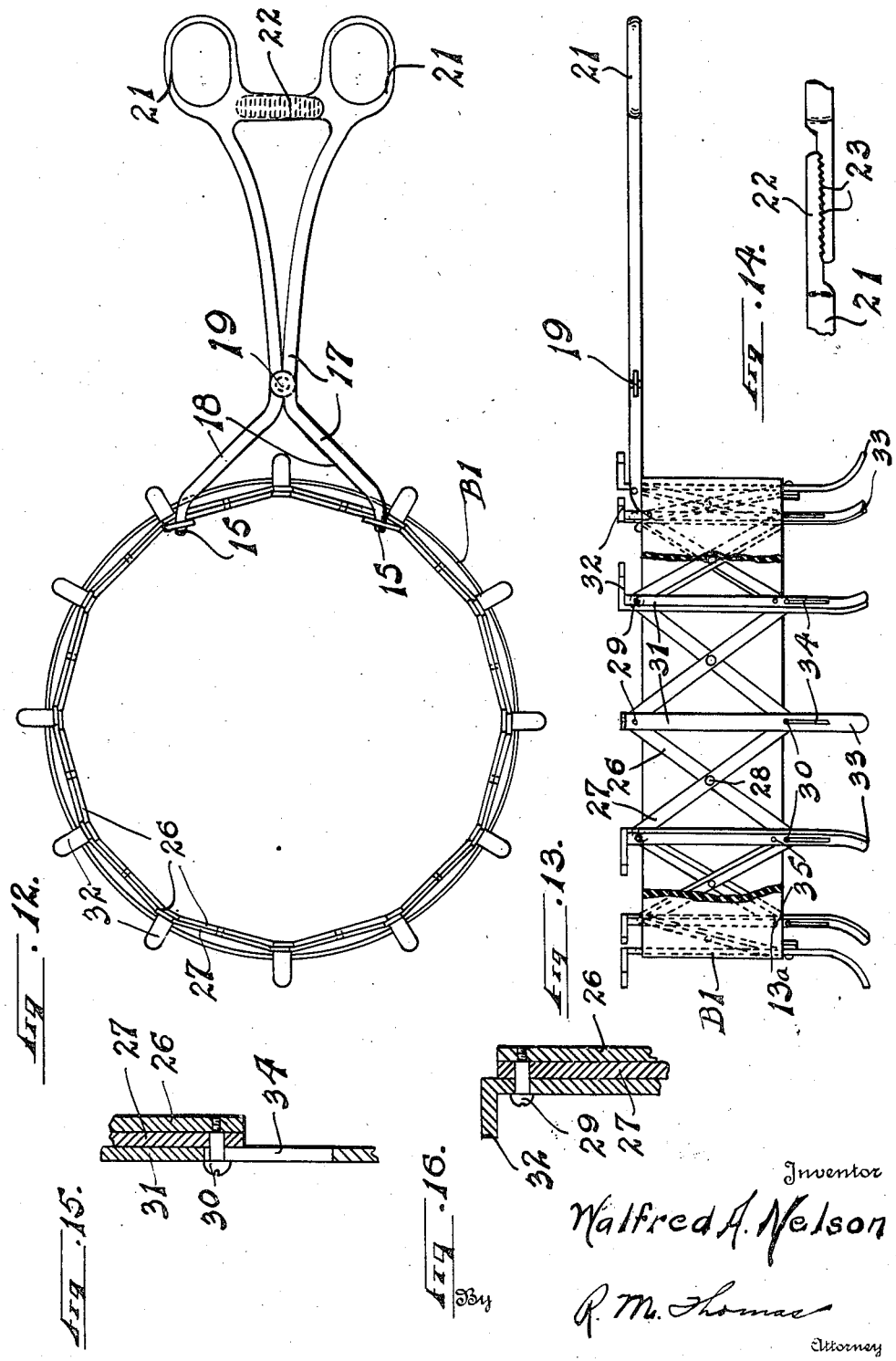

Patented Mar. 9, 1943

2,313,164

UNITED STATES PATENT OFFICE 2,313,164

SELF-RETAINING SURGICAL RETRACTOR

Walfred A. Nelson, Salt Lake City, Utah

Application November 13, 1939, Serial No. 304,183

5 Claims. (Cl. 128—20)

My invention relates to surgical instruments and has for its object to provide a self-retaining surgical retractor adapted to give increased consistent pressure on the walls of an incision of various operations upon the human body, or if desired, in veterinary surgery.

The invention comprises an annular expansible frame adapted for insertion in the incision and embodying means for maintaining the instrument in its expanded position, relieving the surgeon as well as his assistant from manually maintaining the instrument in the expanded position while performing the operation through any incision.

A still further object of the invention is to provide a retractor designed mainly for abdominal operations, comprising an expansible annular frame having outwardly projecting flanges adapted to grasp the edges of the incision for holding the retractor in place, and simultaneously serving as a hemostatic agent on all sides of the incision.

A still further object is to provide an instrument of the character set forth which will be economical to manufacture, highly efficient and reliable in performance, and which will meet all the demands of the medical profession for its particular purpose.

Also for the size of incision, this device gives the greatest possible view of the structure underlying the incision.

These objects I accomplish with the device illustrated in the accompanying drawings in which similar numerals and letters of reference indicate like parts throughout the several views and as described in the specification forming a part of this application and pointed out in the appended claims.

In the drawings,

Figure 1 is a side elevational view of the abdominal retractor with a portion of the elastic dam broken away shown in the expanded position with the handles removed as they would be when in use during an operation and with locking chain shown in dotted lines.

Figure 2 is a vertical section through one side of the abdominal retractor primarily to show the relative position of the elastic dam in the contracted position the locking chain being omitted from this view.

Figure 3 is a fragmentary side elevation of the legs of the abdominal retractor in the contracted position.

Figure 4 is a view similar to that shown in Figure 2 with the retractor shown in the expanded position it would be when inserted into an incision, expanded into position for operating.

Figure 5 is a view similar to Figure 4 showing a segmental view of the use of the retractor when expanded into an incision the locking chain being omitted from this view.

Figure 6 is a plan view of a portion of the handles showing how they attach to two of the legs of the retractor.

Figure 7 is an edge view of one of the legs of the handle passed through a segment of one of the legs of the retractor.

Figure 8 is a perspective view of the rubber dam used in the device.

Figure 9 is an inside elevation of a modified type of device showing a different shape of the legs with the legs shown expanded with the locking chain shown diagrammatically.

Figure 10 is a vertical sectional view of one edge of the legs such as shown in Figure 9 showing the modified type of the device.

Figure 11 is a fragmentary elevation showing the legs of the type shown in Figure 10 in the clasped position with the rubber dam omitted from this view.

Figure 12 is a plan view of the modified type of the device showing the handles attached thereto as in the expanding position within an incision no locking chain being shown in this view.

Figure 13 is a side elevation of Figures 12 with part of the rubber dam broken away and with the locking chain omitted from this view.

Figure 14 is a detailed view of the locking teeth for the expanding handles.

Figure 15 is a fragmentary sectional view showing the leg connections for the bottom end of the legs.

Figure 16 is a similar view showing the upper leg connections.

This application is a continuation-in-part of my former patent application Serial No. 239,572, filed Nov. 8, 1938.

In the drawings, I have shown my retractor as A, to which suitable expander handles are attached for operation, with some of the handles made attached to the retractor and other types of handles made removable, those being shown being the removable type as this type would meet most demands of surgeons.

The retractor A is made of expanding cooperating blades hingedly connected at their ends and medially thereof and formed so that when inserted into an incision, the device is expanded the desired amount, retracting the side walls of the incision and holding them out for easy and hand free operating by the surgeon.

In Figures 1 to 7, inclusive, I have illustrated a form of the invention designed for use in abdominal operations and which embodies the annular lazy-tong frame formed of inner blades 6 and outer blades 7 pivotally connected in pairs to each other intermediate their ends as at 8. The ends of the inner blades are pivotally connected adjacent the opposite ends of adjoining outer blades as at 9 to form the continuous annular frame.

Each end of the outer blades 7 is bent angularly outwardly to form the flanges 10 and 11, the flanges 10 extending in a direction at right angles to the axis of the frame and uniformly inclined with respect to the planes of the respective blades, as shown to advantage in Figure 3, while the flanges 11 are inclined away from the flanges 10 and extend at an inclined angle with respect to the longitudinal center lines of the respective blades. Another way of expressing the form of the outer blades 7 is that they are alike and each has the top end bent angularly outwardly at right angles to the plane of the blade and twisted or inclined slightly with respect to the longitudinal center line of the blade. The lower end of each of the blades 7 is bent at an obtuse angle to the main body of the blade and inclined away from the flange 10 to form a flange 11, which flange is also twisted or inclined. The flanges 10 are positioned outwardly of the incision, while the flanges 11 are positioned inwardly thereof, and when the frame is expanded or opened in the manner shown in Figure 1, the outer flanges 10 lie flatly against the outer surface of the skin adjacent the incision while the inner flanges 11 lie flatly against the peritoneum on the inside of the incision, as shown in Figure 5.

The expanding action of the frame circumferentially also serves to move the flanges toward each other from the position shown in Figure 2 to that shown in Figure 4, whereby the flanges grasp the edges of the incision to hold the retractor firmly in place. Certain of the outer blades 7 are provided with the headed pins 12 for attaching the elastic band B thereto.

A handle 17 is provided for controlling and expanding the retractor as fully shown in Figures 12 and 13 with small sectional views 6 and 7 showing the means for attaching the handles 17 to the legs 7, of Figure 1. The top end of two of the legs 7 is formed with an extended eye 14 through which the curved or hook ends 15 of the legs 18 are adapted to be passed and hooked into the eyes 14 to lock the handles to the legs 7 for operating the retractor.

The expander consists of a pair of opposed legs 18 pivoted intermediate their ends as at 19 with the outer end of the legs formed as curved hooks 15 adapted to engage the eyes of any pair of blades so equipped, while the other ends of the legs 18 are formed with finger openings 21. The inner edges of the finger grips 21 are provided with overlapping extensions 22 having toothed contacting surfaces 23 arranged with the teeth thereof extending inwardly opposed to each other whereby the finger grips 21 may be locked against a separating movement should it be desired to use the retractor with the handles attached.

The elastic band B is provided adapted to encircle the main body of the retractor and be held thereon by passing the heads of the headed pins 12 through openings or small holes 13 in the elastic band, the two edges of the band terminating adjacent the flanges in the blades 7. The elastic band B has a tendency to contract the retractor A and accordingly when the handle 17 is engaged with the retractor in the position shown in Figures 12 and 13 the device may be expanded and then secured in the expanded position by reason of engagement of the toothed surfaces 23 or the retractor may be locked into fully or partially expanded position by a chain 24 having one end secured to one of the lower pivot pins 9 and the other end of the chain is extended transversely of the retractor or across the inner face thereof and engaged with one of the links engaging a hook 25 formed on one of the top pivot pins 9.

In Figures 12 and 13 a modified type of the device is shown in which the retractor is made of pivoted legs 26 and 27 forming the entire ring assembly of the device and shown pivoted medially at 28 with an upper pivot screw 29 pivoting the top ends of the legs together and a pivot screw 30 pivoting the bottom ends of the legs together.

Also attached to the screws 29 and 30 there are vertical bars 31 formed with the upper end bent at right angles to form an outwardly extended flange 32 and with the lower ends provided with outwardly curved extensions 33, with slots 34 formed through the lower portion of the bars 31 riding on the screws 30 to permit expansion and contraction of the device. The head of the pivot screw 30 is enlarged to prevent accidental removal of the bars 31. The outer surface of some of these bars 31 are provided with a plurality of vertically-shaped headed studs 35 adapted for insertion through the openings or holes 13a in the elastic band B1 with one edge of the band B1 terminating adjacent the right angled ends of the rods 31. The same handles are used for both types of devices.

In the operation of the device, the retractor in its constricted position is inserted into the incision in the body with the flanged ends 11 positioned inwardly and upon manipulation of the tool 17 the retractor will be expanded or increase the size of the opening as desired, so that proper examination or operation may be made through the incision.

The elastic band B contacts the walls of the incision in which the instrument has been inserted and serves as a dam or "hemostat" to retard or prevent bleeding and at the same time protects the tissues from injury during operation, keeping the greater portion of the blades and rods from contacting the tissue. The exact position of the device in reference to an incision may be more clearly seen by an examination of figure 5 wherein the tissues are shown with the retractor in place.

It will be possible to make a device, as shown in Figure 13, with most of the bars 31 removed using only three along one side and these three will preferably be made of a pliable metal so that the device may be used in this form to a great advantage when operating on the liver or gall bladder as the bars may be inserted and so bent as to retract the liver from around the protruding gall bladder.

Such modifications and variations in the device are considered within the spirit of the invention and the scope of the claims and it is believed that the details of construction and manner of operation of the device will be readily understood from the foregoing without further detailed explanation.

Having thus described my invention, I desire to secure by Letters Patent and claim:

1. A surgical retractor of the class described comprising, a plurality of sets of parallel blades pivotally mounted to other like sets at the ends and medially thereof to form an annular expanding ring with the top of certain of said blades bent outwardly at right angles and with the bottom of the same blades bent outwardly at an angle less than a right angle; an elastic band circling the medial portion of said retractor adapted to press against the side walls of the incision when the retractor is expanded and yieldably normally holding the retractor in the contracted position; and removable means for expanding the retractor into an incision.

2. A surgical retractor comprising, a set of plurality of parallel blades pivoted to a set of like-formed parallel blades the medial portion of each set being pivoted together in a lazy-tong manner forming a circular frame with the ends of certain of said blades extended outwardly in flanges, said flanges being bent with the top flange of each blade at substantially right angles to the body of the blade and the lower flange bent at an obtuse angle to said blade and both flanges being twisted with respect to the central longitudinal line of said blade, the substantially right angled flanges on one end adapted to engage the surface of the skin adjacent an incision and the flanges on the other end adapted to engage the peritoneum within the incision, said flanges adapted to cooperate with each other to clamp the edge of the incision therebetween when the frame work is expanded.

3. A device as set out in claim 2 including, means to lock the frame in the expanded position and a rubber dam encircling the frame adapted to normally hold the frame in contracted position.

4. A surgical retractor comprising, a plurality of blades connected in lazy-tong arrangement to form a circular frame; an elastic band surrounding the frame, each of said blades being curved outwardly at one end and projecting beyond the adjacent edge of the band and a pivoted tool engageable with the opposite ends of certain of said blades for expanding the frame; and means for securing the frame in its expanded position, said means comprising a flexible member securing the blades against contracting movement.

5. A surgical retractor of the class described comprising a plurality of sets of parallel blades pivotally mounted to other like sets at the ends and medially thereof in a lazy-tong manner to form an annular expanding ring; pivotal means to pivotally mount said blades together; another set of superimposed parallel blades having their top ends pivotally attached to the other sets of parallel blades by the same pivotal means, and having longitudinal slots near their lower ends in which the pivotal means of the lower ends of the other blades may operate and with the lower ends of said superimposed blades curved outwardly; eyes formed on the top end of two of said pivoted blades; a handle formed of pivoted legs with the free ends of said legs engaging said eyes and said handle being entirely removable from said frame when the retractor is expanded in an incision permitting unobstructed operating space within the ring; attaching means on two adjacent blades; and a flexible member to extend from one attaching means to the other, to be utilized for locking the retractor in the expanded position.

WALFRED A. NELSON.